United States Patent [19]
Krishnakumar et al.

[11] Patent Number: 5,908,128
[45] Date of Patent: Jun. 1, 1999

[54] PASTEURIZABLE PLASTIC CONTAINER

[75] Inventors: Suppayan M. Krishnakumar, Nashua; Wayne N. Collette, Merrimack; David Piccioli, Auburn, all of N.H.

[73] Assignee: Continental PET Technologies, Inc., Florence, Ky.

[21] Appl. No.: 08/503,107

[22] Filed: Jul. 17, 1995

[51] Int. Cl.⁶ ........................................................ B65D 1/02
[52] U.S. Cl. ........................ 215/381; 215/382; 220/721; 220/675
[58] Field of Search ...................... 215/373–375, 215/377, 381, 382, 341, 349, 383, 384, 675; 220/669, 721

[56] References Cited

U.S. PATENT DOCUMENTS

| | | |
|---|---|---|
| D. 295,381 | 4/1988 | Papa . |
| D. 315,869 | 4/1991 | Collette . |
| 4,231,483 | 11/1980 | Dechenne et al. ................... 215/373 X |
| 4,481,163 | 11/1984 | Ota et al. ............................. 215/382 X |
| 4,497,855 | 2/1985 | Agrawal et al. ..................... 215/381 X |
| 4,700,860 | 10/1987 | Li ........................................ 215/341 X |
| 4,749,092 | 6/1988 | Sugiura et al. . |
| 4,818,575 | 4/1989 | Hirata et al. . |
| 4,863,046 | 9/1989 | Collette et al. . |
| 4,928,835 | 5/1990 | Collette et al. ............................ 215/42 |
| 4,981,229 | 1/1991 | Lanham .................................. 215/232 |
| 4,993,565 | 2/1991 | Ota et al. . |
| 5,005,716 | 4/1991 | Eberle ................................. 215/383 X |
| 5,054,632 | 10/1991 | Alberghini et al. . |
| 5,064,081 | 11/1991 | Havashi et al. . |
| 5,104,706 | 4/1992 | Krishnakumar et al. ........... 200/606 X |
| 5,141,120 | 8/1992 | Brown et al. . |
| 5,141,121 | 8/1992 | Brown et al. . |
| 5,178,289 | 1/1993 | Krishnakumar et al. . |
| 5,238,129 | 8/1993 | Ota . |
| 5,250,333 | 10/1993 | McNeeley et al. ..................... 428/35.7 |
| 5,255,889 | 10/1993 | Collette et al. . |
| 5,281,387 | 1/1994 | Collette et al. . |
| 5,303,833 | 4/1994 | Hayashi et al. .......................... 215/381 |
| 5,337,909 | 8/1994 | Vailliencourt . |
| 5,341,946 | 8/1994 | Vailliencourt et al. . |
| 5,392,937 | 2/1995 | Prevot et al. . |

FOREIGN PATENT DOCUMENTS

| | | |
|---|---|---|
| 0 322 651 A2 | 7/1989 | European Pat. Off. . |
| 0 446 532 A1 | 9/1991 | European Pat. Off. . |
| WO94/18077 | 8/1994 | WIPO . |
| WO96/13436 | 5/1996 | WIPO . |

OTHER PUBLICATIONS

Australian Design Application No. 3503/93 filed Nov. 5, 1993.

Australian Design Application No. 3629/93 filed Nov. 17, 1993.

Australian Design Application No. 1475/94 filed May 12, 1994.

Schweppes Sport Plus Bottle (Jul. 1994).

Primary Examiner—Stephen Castellano
Attorney, Agent, or Firm—Wolf, Greenfield & Sacks, P.C.

[57] ABSTRACT

A pasteurizable plastic container having movable panels to alleviate internal pressure changes during pasteurization in order to avoid uncontrolled permanent deformation of the container body. As molded, each panel has a shallow recessed central wall which during the increased temperature and pressurization of pasteurization, moves outwardly to alleviate at least part of the internal pressure. During cooling, the panels move back inwardly to alleviate at least part of the negative pressure. The container may further include hoop ribs in the land areas above and below the panels, an axially elongatable hoop rib in an upper shoulder section, and an angled heel portion adjacent the standing ring. These additional elements further restrict uncontrolled bulging of the post walls, which would lead to improper label application and/or excessive volume change.

32 Claims, 8 Drawing Sheets

PASTEURIZABLE PLASTIC CONTAINER

FIELD OF THE INVENTION

The present invention relates to a pasteurizable plastic container having a plurality of flexible panels which accommodate both an increase and subsequent decrease in pressure during pasteurization, in order to avoid permanent uncontrolled deformation of the container.

BACKGROUND OF THE INVENTION

Figure 1:
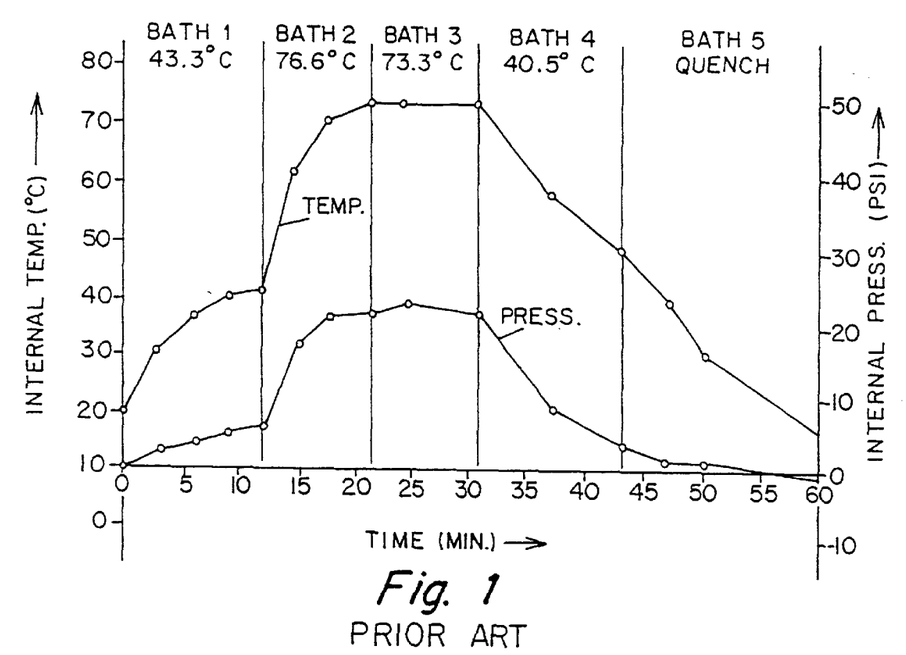
FIG. 1 is a graph illustrating a pasteurization cycle, showing changes in internal temperature and pressure over time for a prior art 16-ounce glass juice container.

Prior art beverage containers designed for use in a pasteurization process have typically been made of glass because glass can withstand the extended high temperatures and high internal pressures of this process. FIG. 1 illustrates graphically, as a function of time, the increasing internal temperature and pressure for a pasteurizable 16-ounce glass container. The pasteurization cycle has five components:

(1) emersion in bath 1 for a period of about 12.5 minutes in order to raise the container and contents up to about the bath temperature of 43° C.;

(2) emersion in bath 2 during a time period from about 12.5 to 21 minutes in order to raise the container and contents up to about the bath temperature of 77° C.;

(3) emersion in bath 3 during a time period from about 21 to 31.5 minutes in order to hold the container and contents at about the bath temperature of 73° C.;

(4) emersion in bath 4 during a time period from about 31.5 to 43 minutes in order to lower the container and contents down to about the bath temperature of 40° C.; and (5) emersion in quench bath 5 for a time period from about 43 to 60 minutes in order to cool the container and contents down to about 10° C.

The top curve shows that the temperature of the container (and contents) remains above 70° C. for roughly ten minutes, during which time there is a significant increase in internal pressure to about 20 psi. There is a slight negative internal pressure at the end of the cycle. A glass container can withstand these temperatures and pressures without deformation.

There is a need to provide a plastic container able to withstand pasteurization in order to gain the advantages of plastic over glass, i.e., light-weight, shatter-resistance, etc. However, known carbonated beverage and/or hot fill polyester containers can not be expected to withstand these temperatures and pressures without substantial deformation. The prior art teaches that a plastic container for pasteurization would require a very high level of average crystallinity in the panel section (e.g., 35–40%), achievable either by high-temperature heat setting or an expensive double-blowing process. It would be desirable, however, to provide a less expensive method of making a pasteurizable polyester container having a relatively low level of crystallinity, i.e., below 30%.

SUMMARY OF THE INVENTION

The present invention is directed to a pasteurizable biaxially-oriented plastic container. The container does not require heat setting or a double-blowing process. It has flexible panels which move temporarily radially outwardly to relieve an increase in pressure during the heating step of pasteurization and (the flexible panels) then return inwardly during cooling. The panels are relatively shallow (if they are too deep they will not move out easily) and remain within the cylindrical panel circumference. The panels provide the highest level of hoop flexibility in the container to ensure that the panels alleviate the pressure changes during heating and cooling, as opposed to other portions of the container, and thereby avoid permanent uncontrolled deformations which would render the container unusable.

In a particular embodiment, the container has six recessed panels symmetrically arranged about the panel circumference, each panel having an initial (as molded) shallow recessed central wall. The central wall may have a depth to width ratio D/W on the order of 0.01 to 0.15, and more preferably on the order of 0.03 to 0.08 (see FIG. 7). Each central wall may have a circumferential angular extent 26 on the order of 32 to 50°, and more preferably 36 to 46°. Post walls (between the recessed panels) may have vertical ribs to stiffen the same, and the land areas in the panel section, above and below the recessed panels, may have recessed circumferential hoop ribs to stiffen the same. Still further, a flared upper shoulder section of the sidewall may have an outwardly protruding profile (as molded) for increased orientation and strength to avoid permanent deformation. The shoulder may include a recessed circumferential hoop rib which temporarily axially elongates during the heating step of the pasteurization cycle in order to reduce the internal pressure. Still further, a champagne-style base may be provided having a central recessed dome surrounded by a standing ring (chime) which lies in a horizontal plane; the dome may be angled upwardly at an angle A with respect to the horizontal plane in order to provide an area for controlled expansion, adjacent the standing ring. This prevents the standing ring from bowing outwardly to a rounded configuration, which would reduce the standing stability and further increase the container height. The angle A may be on the order of 5 to 15°, and more preferably 8 to 12°.

In an alternative embodiment, the circumferential panel section is molded in an inwardly-bowed configuration, so that expansion of the post walls during pasteurization will cause the post walls to assume a substantially cylindrical configuration. A further alternative includes molding a protrusion in the central panel wall to provide an additional area for supporting the label (which is wrapped around the panel section); a recessed vertical rib may be provided in the protrusion for longitudinal stiffness.

The open upper end of the container may include an unexpanded threaded neck finish. In one embodiment, the neck finish is opacified (crystallized) and a vacuum holding closure (cap) is applied having a resilient liner which seals a top surface of the crystallized neck finish. In an alternative embodiment, an amorphous neck finish is provided and a foil liner is sealed to a top surface of the neck finish. In both cases, the liner ensures a tight seal to prevent leakage if there is any deformation of the neck finish caused by the high pasteurization temperature.

These and other advantages of the present invention will be more particularly described in regard to the following description and drawings of select embodiments.

DETAILED DESCRIPTION

Applicants have found that if a commercial polyethylene terephthalate (PET) hot-fill juice container is subjected to a pasteurization cycle, it undergoes permanent uncontrolled deformation. More specifically, excessive permanent deformation occurs: in the chime, which makes the container unstable; in the panel, which makes smooth (wrinkle-free) label application difficult; and an overall volume increase produces an unacceptable drop in the fill line (i.e., the container appears to the consumer as being less than full). For all of these reasons, the prior art hot-fill container cannot be used.

Figure 2:
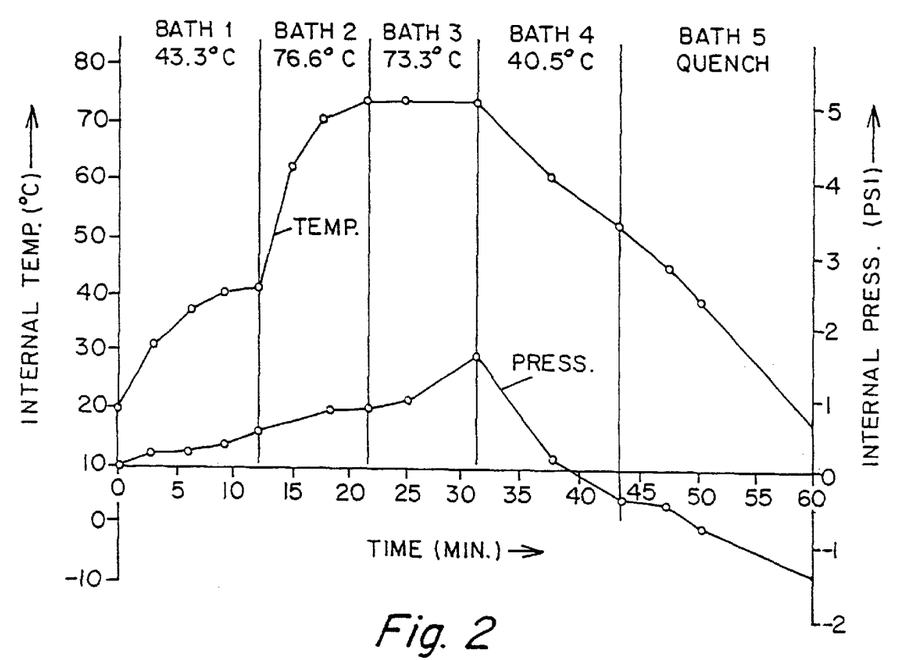
FIG. 2 is a graph illustrating the internal temperatures and pressures during pasteurization for a PET container according to one embodiment of this invention.

Instead, applicants have designed a plastic container having flexible panels which avoids these problems and which accommodates the changing internal pressure in a manner not possible with a glass container. FIG. 2 illustrates the temperature and pressure profiles over time for the plastic container of this invention, for comparison to the prior art glass container of FIG. 1. The plastic container undergoes a temperature profile (FIG. 2, top curve) similar to the glass container, but the internal pressure (FIG. 2, bottom curve) is much reduced. The pressure scale in FIG. 2 is 10× lower than that in FIG. 1, and shows a maximum internal pressure with the plastic container of about 2 psi. There is a more extended period of negative pressure at the end of the cycle.

Figure 3:
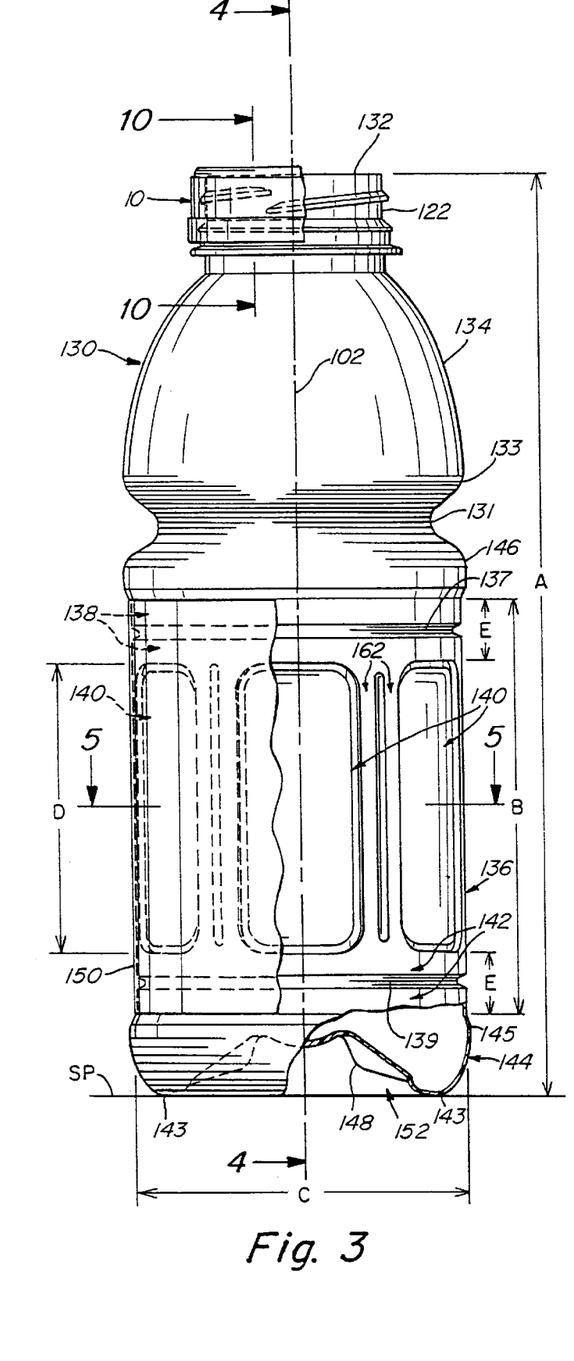
FIG. 3 is a side elevational view, partially broken-away, of a pasteurizable PET container according to one embodiment of the present invention.
Figure 12:
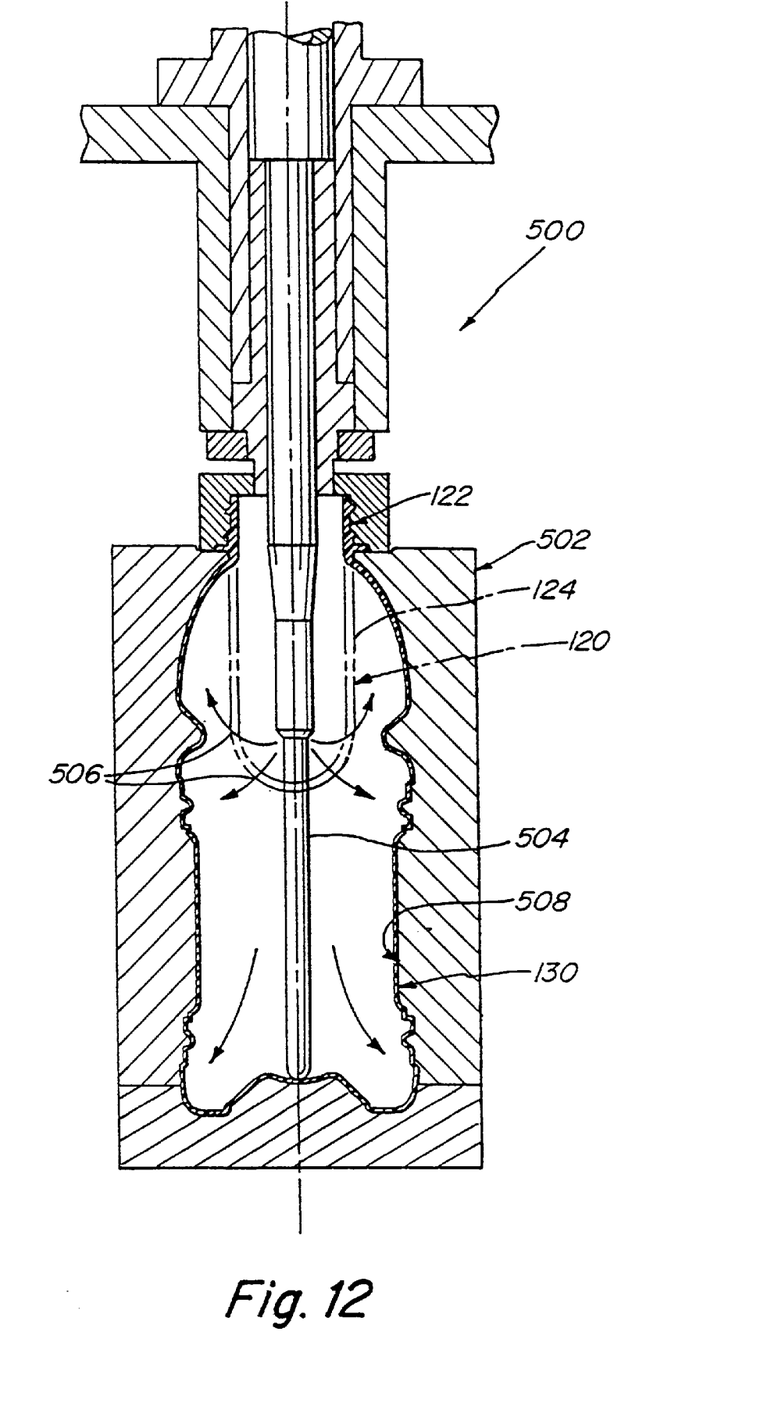
FIG. 12 is a schematic view, taken in cross-section, of a stretch blow molding apparatus for making the container of the present invention.

FIG. 3 shows a particular embodiment of a pasteurizable PET beverage bottle according to the present invention. The bottle 130 is stretch blow molded from an injection molded preform, as shown in FIG. 12. A tubular body-forming portion 124 of the preform is expanded and assumes the shape of an interior molding surface 508 (see FIG. 12), in order to form a substantially transparent, biaxially-oriented container body 130. An upper thread finish 122 is not expanded. The bottle has an open top end 132 and receives a screw-on cap 10 (shown partially in section). The expanded body of the container includes:

(a) an upper flared shoulder section 134 with an outwardly protruding profile, and which generally increases in diameter from the neck finish to a cylindrical panel section 136;

(b) the cylindrical panel section 136 including six movable recessed panels 140 surrounded by upper and lower land areas 138 and 142, and vertical post walls 162; and (c) a closed bottom end or base 144.

A full-wrap label 150 (shown partially in FIG. 3) is applied over the panel section 136.

Container 130 has a volume of 20 ounces (oz), a total height A of about 195 mm, a panel section height B of about 89 mm, a panel section diameter C of about 72 mm, a panel recess height D of about 62, and upper and lower land areas each about 13.5 mm in height E. The container is made from bottle-grade PET, e.g., a PET having about 1.5% comonomer and an intrinsic viscosity of about 0.80. The panel section has a wall thickness on the order of 0.4 mm.

The shoulder section 134 protrudes radially outwardly for greater strength, i.e., this shape requires greater radial expansion during blow molding, and thus achieves greater orientation (strength). A recessed circumferential hoop rib 131 is provided just above the panel section, which rib temporarily axially elongates (opens up along centerline 102 to increase the height of the container) in order to alleviate the increased pressure during the pasteurization heating step. The rib substantially returns during cooling without significant permanent deformation. In this embodiment, the hoop rib is defined by a bottom radius $r_3$ (see FIG. 4) on the order of 4.0 to 4.5 mm and a connecting radius $r_4$ (to the sidewall) on the order of 6.0 to 6.5 mm. The rib 131 has a radial depth $d_3$ with respect to the lower end 146 of shoulder 134 on the order of 6.5 to 7.0 mm, and a radial depth $d_4$ with respect to the upper bumper 133 of panel 136 (also) on the order of 6.5 to 7.0 mm. The bottom radius $r_3$ forms an angle $\theta_3$ with the horizontal on the order of 30–35° and connects to the sidewall at an angle $\theta_4$ on the order of 30–35°, which together ($\theta_3+\theta_4=60–70°$) provide rib 131 with enough "spring" to enable it to open up and close in response to internal pressure changes.

The hoop rib 131 is provided between enlarged diameter portions 133 and 146. The bumper 146 is of a greater diameter than the panel section in order to protect the attached label 150 during shipment and storage. The base 144 similarly provides an enlarged diameter lower bumper 145. The base further includes a central recessed dome 152 surrounded by a standing ring or chime 143 which lies in a horizontal standing plane SP. The dome includes six protruding ribs 146 (see FIGS. 8–9) for increased orientation in the base to strengthen the base against inversion. The dome is designed to move as a whole, with the chime 143 acting as a hinge point, in order to alleviate the positive pressure generated during the pasteurization heating step and the negative pressure generated during the pasteurization cooling step.

Figure 4:
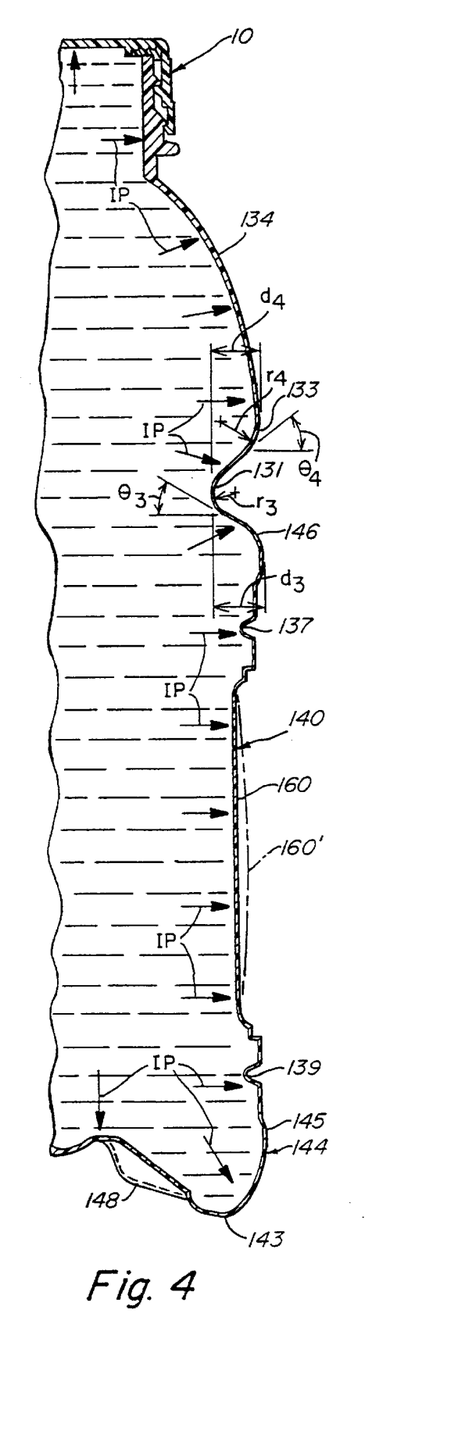
FIG. 4 is a vertical cross-section taken along line 4—4 of FIG. 3, showing the temporary outward deflection of the panel recess during the high temperature portion of the pasteurization cycle.

The substantially cylindrical container sidewall, defined by vertical central axis 102, is shown in vertical cross-section in FIG. 4. FIG. 4 shows the filled and sealed container during the heating cycle of pasteurization, wherein an increase in internal pressure, denoted by arrows P, pushes outwardly on all portions of the container. In the present invention, the recessed panels 140 are the most flexible portion of the container, and therefore the first portion to deform during the pressure increase. The panels are molded with a shallow inwardly-bowed central wall 160 (solid line in FIG. 4), which flexes to an outwardly-bowed second position 160' during heating to help alleviate the increase in pressure within the sealed container. The second position may be outwardly bowed, but remains within the panel circumference (i.e., diameter C) so that the deformation is temporary and not permanent. The central panel wall 160 moves back inwardly to an inwardly-bowed third position during the cooling process (shown in FIG. 6), in order to help relieve the negative pressure generated during cooling. The flexibility and ready movement of the panels prevents large uncontrolled distortions of other portions of the container.

Figure 5:
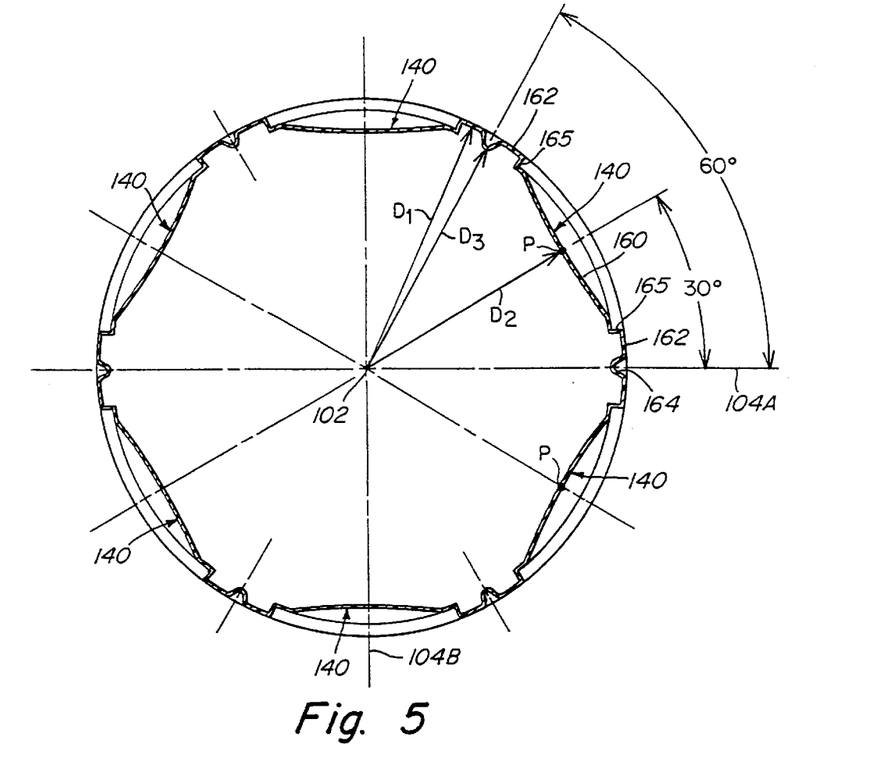
FIG. 5 is a horizontal cross-section taken along line 5—5 of FIG. 3 of the panel section prior to filling.

FIG. 5 is a horizontal cross section showing six panels 140 recessed with respect to the panel circumference and symmetrically disposed about a vertical centerline 102. The panels 140 are also symmetrical about each of two orthogonal vertical planes 104A and 104B passing through the centerline 102. Each panel 140 is disposed between a pair of vertical post walls 162, which constitute part of the outermost cylindrical panel wall (the panel circumference). The post walls are disposed at a first radial distance $D_1$ from the vertical centerline 102. Each panel 140 includes a central wall 160 which forms a shallow arc or other concave shape in horizontal cross-section, the mid-point P of the wall being disposed at a second distance $D_2$ from the vertical centerline 102 which is less than the first distance $D_1$ of post wall 162. The central wall 160 is defined between opposing shoulders 165, which are recessed inwardly from the panel circumference, and which define hinges to enable ready flexibility of the central wall. A vertically-elongated and recessed post rib 164 is provided in post wall 162 mid-way between each panel 140, to provide longitudinal stiffness, and is disposed a third distance $D_3$ from the centerline 102 which is less than the first distance $D_1$ of the post wall 162. The post rib 164 is a relatively small-radiussed arc (defined by $r_1$) with rounded edges (defined by larger radius $r_2$) for a smooth continuation into the adjoining post wall 62.

Figure 6:
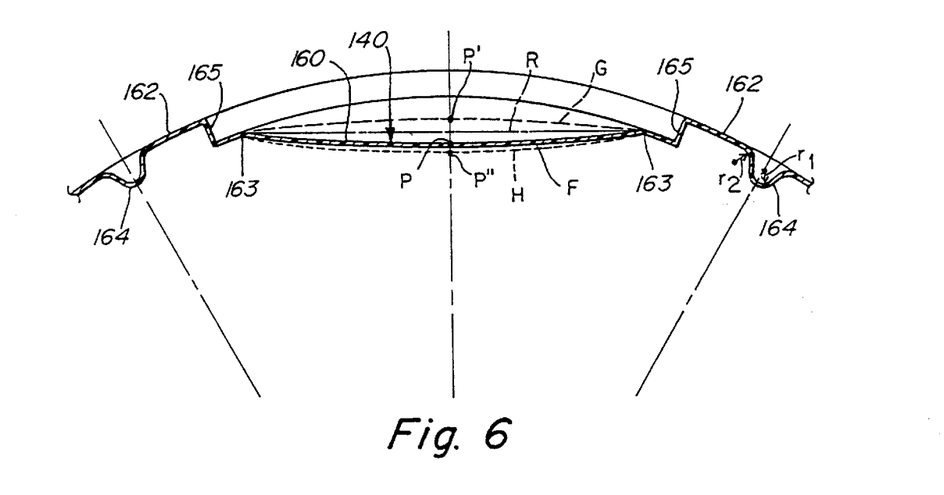
FIG. 6 is an enlarged fragmentary horizontal cross-section of the panel of FIG. 5, showing movement of the central recess wall from an initial position A, to a temporary expanded position B during the heating step, and a returned position C following cooling.

In this six-panel embodiment, each of the six panels and their respective post walls occupies an angular extent of 60°, out of a total panel circumference of 360°. As shown in FIG. 6, the central wall 160 extends across an area defined by side edges 163 which form junctures with shoulders 165. As shown in FIG. 6, the shallow central wall adopts three positions (with respect to a straight reference line R between points 163): an initial (as molded) position A, which is inwardly bowed, and wherein point P is located radially inwardly from reference line R; a second position B during heating which is outwardly bowed, and wherein point P' is located radially outwardly from reference line R; and a third position C following cooling wherein the panel pops back inwardly to assume an inwardly bowed profile, and wherein point P" is again located radially inwardly from reference line R.

Figure 7:
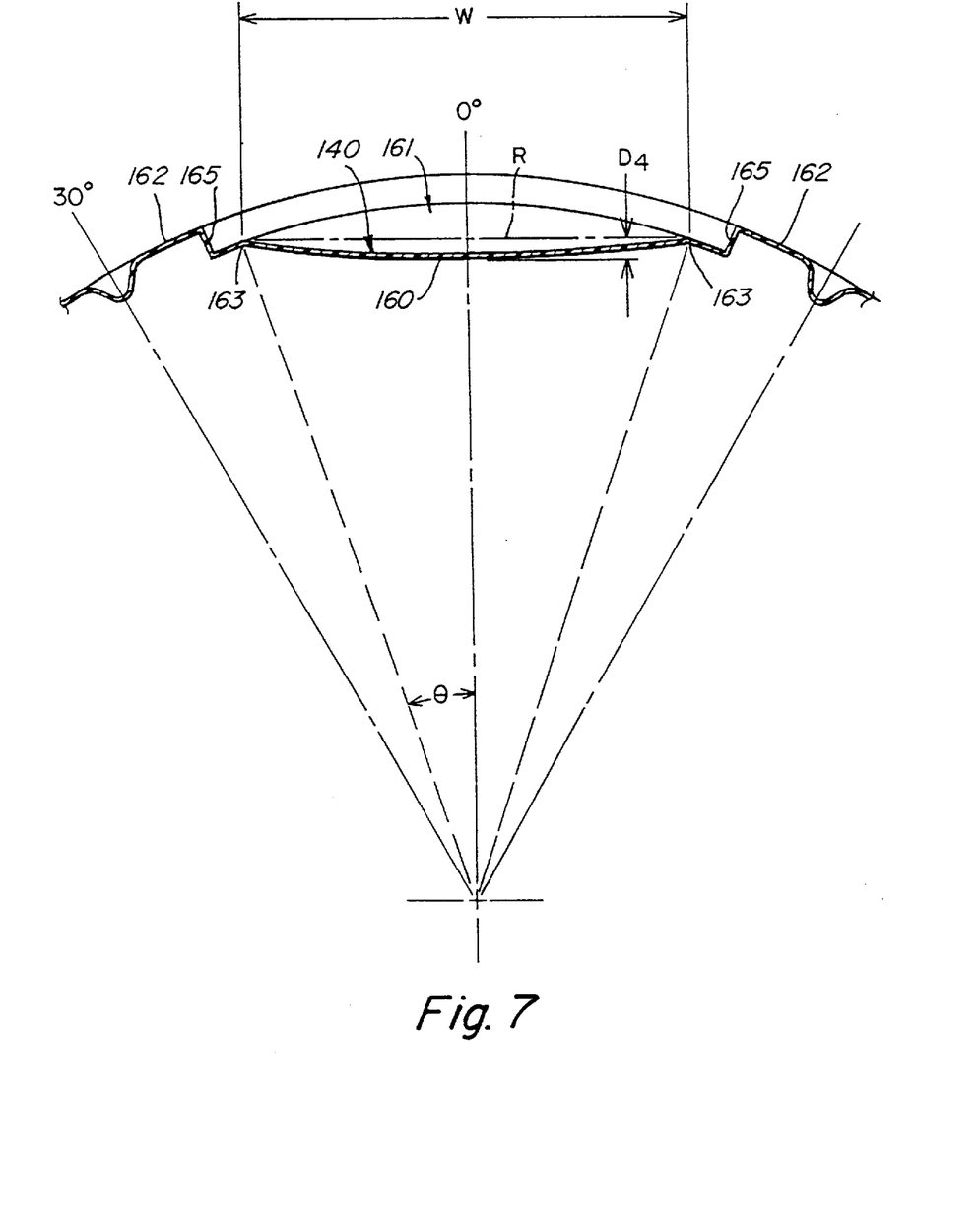
FIG. 7 is an enlarged fragmentary cross-sectional view similar to FIG. 6, showing the depth D to width W ratio of the central recess wall according to the present invention.

FIG. 7 shows a preferred depth to width D/W ratio and circumferential angular extent 2θ for the central wall 160. As molded, the central wall has a depth D defined at the bottom of the recess P with respect to reference line R, and a width W defined by the length of reference line R between the end points 163. The ratio D/W is on the order of 0.01 to 0.15, and more preferably on the order of 0.03 to 0.08. The circumferential angular extent 2θ of the central wall 160 is on the order of 32 to 50°, and more preferably on the order of 36 to 46°. The post wall 162 and shoulders 165 occupy the remainder of the 60° allocated to each panel, and thus occupy on the order of 40 to 58°. The shoulders 165 help rigidify the post walls so that all deformation occurs in the flexible panels.

To prevent ovalization of the panel and/or hoop collapse, i.e., a vertical crease being formed in the land areas above or below the panels under the negative cooling pressure, recessed circumferential hoop ribs 137, 139 are provided in the middle of the upper and lower land areas 138, 142. In addition, the hoop rib 131 in shoulder 134 is axially elongatable during the heating step, in order to control the expansion of the container. The height increase caused by the axial expansion of hoop rib 131 helps prevent bulging of the post walls 162 and shoulders 165. There is preferably some recovery of the axial elongation during cooling.

Figure 8:
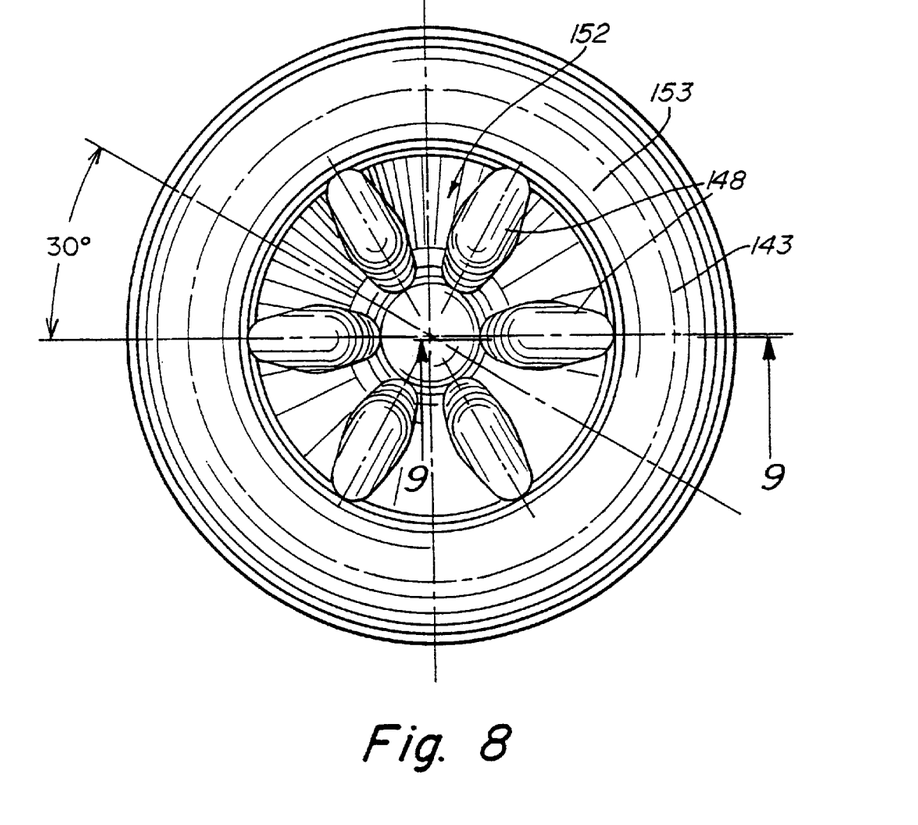
FIG. 8 is a plan view of the bottom of the container of FIG. 3.
Figure 9:
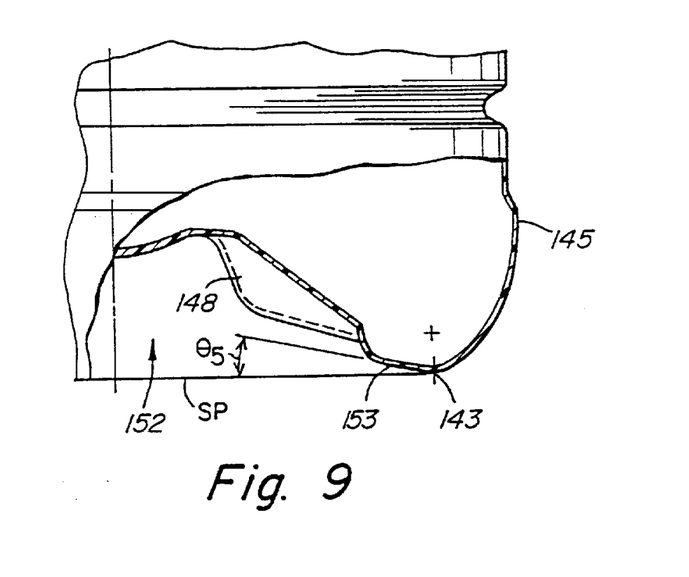
FIG. 9 is an enlarged fragmentary cross-section taken along line 9—9 of FIG. 8, showing the base angle A adjacent the standing ring.

FIG. 8 is a bottom plan view of the base, showing standing ring 143 surrounding central pushed-up dome 152. The dome includes six symmetrically-disposed stiffening ribs 146. As shown in vertical cross section in FIG. 9, the standing ring 143 rests on a horizontal standing plane SP. An area 153 of the dome adjacent the standing ring 143 is disposed at an acute angle with respect to the standing plane SP. That angle A is on the order of 5 to 15°, and more preferably on the order of 8 to 12°. This angled portion 153 provides an area which can expand outwardly during pressurization to help relieve the internal pressure, but without substantially increasing the container height and/or reducing the standing stability of the container. Generally, the area 153 expands outwardly to a planar position in contact with standing plane SP. During cooling, the area 153 generally moves inwardly.

Figure 10:
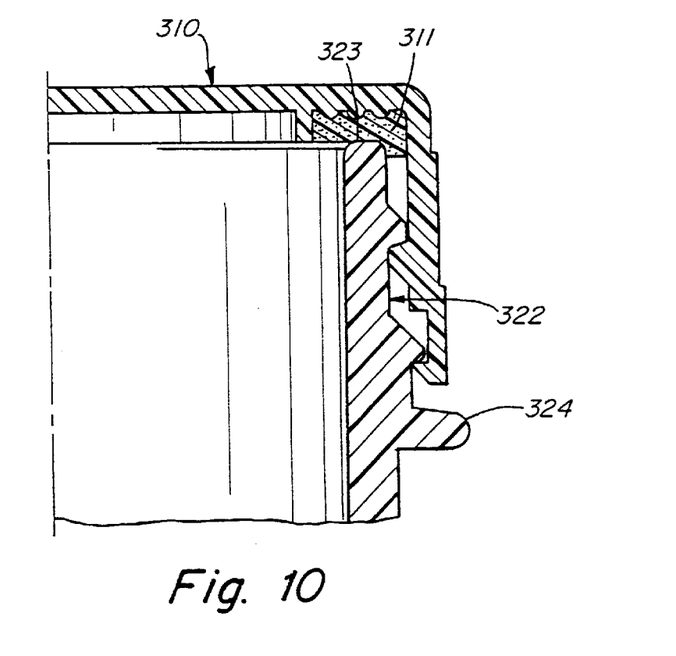
FIG. 10 is an enlarged fragmentary cross-section taken along line 10—10 of FIG. 3 of a crystallized neck finish and cap, according to one embodiment.

FIG. 10 is an enlarged cross section of an opacified neck finish and closure according to one embodiment. More specifically, threaded neck finish 322 has been thermally crystallized (opacified) by high-temperature heat setting; this increases the strength and enhances its resistance to the increased temperature and pressure of pasteurization. The heat-treated area may extend just below the flange 324. A cap 310 has an annular ring 311 of a resilient material (e.g., plastisol or other thermoplastic elastomer) which seals an upper surface 323 of the neck finish. If there is any deformation of the neck finish during pasturization, the liner 311 deforms to ensure a tight seal and prevent leakage.

Figure 11:
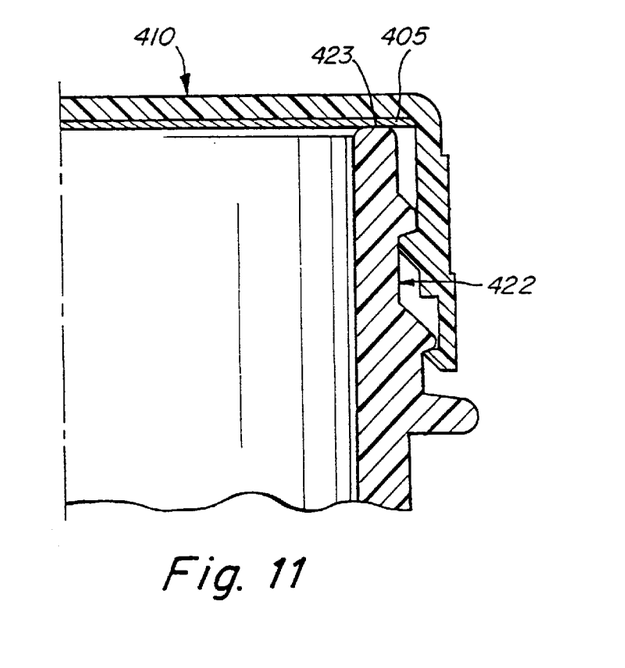
FIG. 11 is an enlarged fragmentary cross-section of an amorphous neck finish and cap, according to another embodiment.

In an alternative embodiment shown in FIG. 11, a substantially amorphous neck finish 422 is provided, i.e., it has not been heat set. In this case, the amorphous neck finish is provided with a laminated foil liner 405, which lies within an inner surface of a cap 410, and which may, for example, be heat sealed or adhesively sealed to an upper surface 423 of the neck finish. Again, if there is any deformation of the neck finish, the liner 405 ensures a tight seal to prevent leakage.

FIG. 12 illustrates a stretch blow-molding apparatus 500 for making the container of this invention. More specifically, a substantially amorphous and transparent PET preform 120 is reheated to a temperature above the glass transition temperature of PET and placed in a blow mold 502. A stretch rod 504 axially elongates the preform within the blow mold to ensure complete axial elongation and centering of the preform. A blowing gas (shown by arrows 506) is introduced to radially inflate the preform in a customary manner to match the configuration of an inner molding surface 508 of the blow mold. The formed container 130 remains substantially transparent but has undergone strain-induced crystallization to provide increased strength. Typically the panel-forming section of the preform is stretched at a planar stretch ratio on the order of 9:1 to 12:1. The panel section of the container has an average crystallinity of up to 30%, preferably on the order of 18 to 28%, and more preferably on the order of 21 to 28%.

The percent crystallinity is determined according to ASTM 1505 as follows:

% crystallinity=[$(ds-da)/(dc-da)$]×100 where ds=sample density in g/cm$^3$, da=density of an amorphous film of zero percent crystallinity (for PET 1.333 g/cm$^3$), and dc=density of the crystal calculated from unit cell parameters (for PET 1.455 g/cm$^3$). The average percent crystallinity is taken with respect to the relevant portion of the container, e.g., with respect to the entire panel section.

The blown container should be substantially transparent based on the percent crystallinity as previously defined. Another measure of transparentcy is the percent haze for transmitted light through the wall ($H_T$) which is given by the following formula:

$H_T = [Y_d \div (Y_d + Y_s)] \times 100$ where $Y_d$ is the diffuse light transmitted by the specimen, and $Y_s$ is the specular light transmitted by the specimen. The diffuse and specular light transmission values are measured in accordance with ASTM Method D 1003, using any standard color difference meter such as model D25D3P manufactured by Hunterlab, Inc. The container should have a percent haze (through the wall) of less than about 15%, more preferably less than about 10%, and still more preferably less than about 5%.

The container may be made of any of the known polymer resins which provide good strength at elevated fill temperatures, such as polyesters, polyolefins, polycarbonates, polyacrylonitriles, and copolymers of the above, as well as other high temperature polymers.

Phthalic acid polyesters based on terephthalic or isophthalic acid are commercially available. The hydroxy compounds are typically ethylene glycol and 1,4-di-(hydroxymethyl)cyclohexane. The intrinsic viscosity for phthalate polyesters are typically in the range of 0.6 to 1.2, and more particularly 0.7 to 1.0 (for O-chlorol-phenol solvent). 0.6 corresponds approximately to a viscosity average molecular weight of 59,000, and 1.2 to a viscosity average molecular weight of 112,000. In general, the phthalate polyester may include polymer linkages, side chains, and end groups not related to the formal precursors of a simple phthalate polyester. Conveniently, at least 90 mole percent will be terephthalic acid and at least 45 mole percent an aliphatic glycol or glycols, especially ethylene glycol.

Another useful polymer, with physical properties similar to PET, is polyethylene naphthalate (PEN). PEN provides a 3–5× improvement in oxygen barrier property (over PET), at some additional expense.

The structures of PET and PEN are shown below:

PET

-continued

PEN

Figure 13:
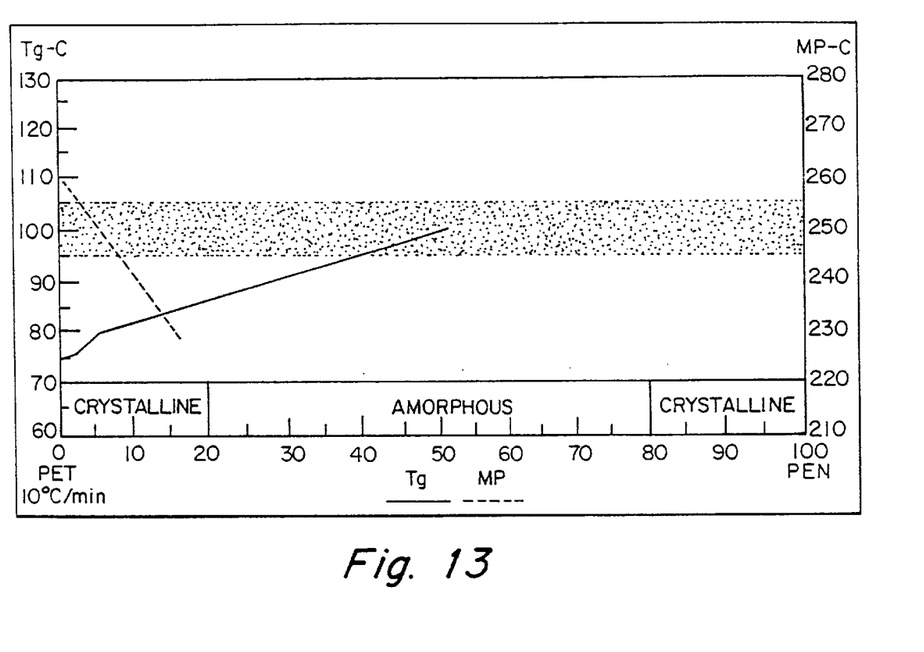
FIG. 13 is a graph of glass transition temperature ($T_g$) and melting temperature ($T_m$) for various "high-PET" compositions of PET and PEN.
Figure 14:
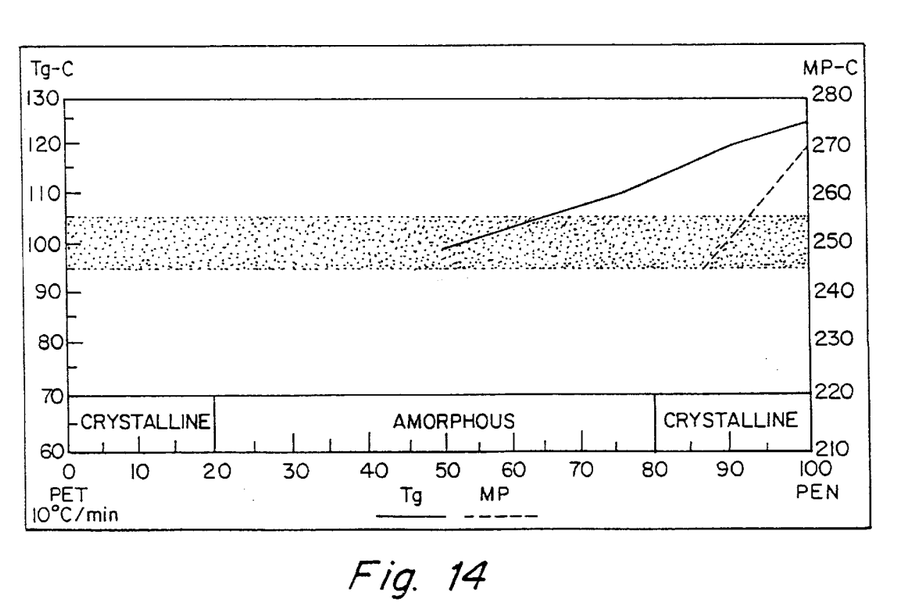
FIG. 14 is a graph of $T_g$ and $T_m$ for various "high-PEN" compositions of PET and PEN.

PET and PEN may be blended or copolymerized in various amounts as shown in FIGS. 13–14.

The container may be either a monolayer, or a multilayer construction, including layers of an oxygen barrier material such as ethylene vinyl alcohol or polyvinyledene chloride, and may include a layer of reprocessed scrap material, such as post-consumer or recycled PET. The container may include a high $T_g$ (glass transition temperature) material as one or more layers to increase the thermal resistance to deformation. Examples of high $T_g$ materials include PEN, polycarbonate, polyacrylate, polyacrylonitrile, and copolymers thereof. The high $T_g$ material may extend up into the neck finish where high torque forces are applied by the cap.

The overall dimensional change following pasteurization of the container may be characterized as one wherein: (a) the container undergoes a height increase on the order of 0.5 to 1.5% compared to the as-molded container height; (b) the panel section undergoes a diameter decrease on the order of 0.2 to 0.7% compared to the as-molded panel section diameter; and/or (c) the container undergoes a volume increase on the order of 1.0 to 2.0% compared to the as-molded container volume.

The container may have other than six recessed panels, e.g., four, five or seven. The total angular extent of the post walls (between the panels) is preferably at least 23% of the panel circumference.

The container may have a closure other than a screw threaded cap, such as a slidable nozzle as used on sports bottles.

Although certain preferred embodiments of the invention have been specifically illustrated and described herein, it is to be understood that variations may be made without departing from the spirit and scope of the invention as defined by the appended claims.

We claim:

1. A plastic container capable of being filled with a liquid product, sealed, and subject to the heating and cooling steps of a pasteurization cycle without substantial deformation, the container comprising:

a molded biaxially-oriented plastic container body having an open upper end for receiving a closure, a sidewall, and a closed bottom end, the sidewall having a panel section with a substantially cylindrical panel circumference and a plurality of recessed panels symmetrically disposed about the circumference; and each panel having a smoothly-curved and shallow central wall which flexes inwardly and outwardy between hinges on opposing edges of the central wall and without stiffening ribs which would prevent outward flexing, the central wall flexing radially outwardly to relieve an increase in internal pressure during heating, and flexing inwardly during cooling to relieve a negative internal pressure during cooling, wherein the panels remain within the panel circumference and prevent uncontrolled permanent distortion of the container body during pasteurization.

2. The container of claim 1, wherein each panel includes a pair of shoulders, recessed from the panel circumference, which form the hinges on opposing sides of the central wall.

3. The container of claim 1, wherein the as-molded central wall is radially-inwardly bowed and temporarily assumes a radially-outwardly bowed profile during the heating step, before returning to a radially-inwardly bowed profile during the cooling step.

4. The container of claim 1, wherein the as-molded profile of the central wall has a ratio D/W of radial depth D, to width W between the hinges, on the order of 0.01 to 0.15.

5. The container of claim 4, wherein the ratio D/W is on the order of 0.03 to 0.08.

6. The container of claim 1, wherein the container body is made of polyester and the panel section has an average straininduced crystallinity of up to 30%.

7. The container of claim 6, wherein the panel section has an average crystallinity on the order of 18 to 28%.

8. The container of claim 1, wherein the container body is made of polyester and the panel section has been strain oriented based on a planar stretch ratio on the order of 9:1 to 12:1.

9. The container of claim 1, wherein the container includes a recessed circumferential hoop rib which expands during the heating step to increase the height of the container and relieve internal pressure.

10. The container of any one of claims 1 and 9, wherein the container undergoes a height increase due to pasteurization on the order of 0.5 to 1.5% compared to the as-molded container height.

11. The container of any one of claims 1 and 9, wherein the panel section undergoes a diameter decrease due to pasteurization on the order of 0.2 to 0.7% compared to the as-molded panel section diameter.

12. The container of any one of claims 1 and 9, wherein the container undergoes a volume increase due to pasteurization on the order of 1.0 to 2.0% compared to the as-molded container volume.

13. The container of claim 1, wherein the panel section includes post walls between the recessed panels, which post walls occupy at least on the order of 23% of the panel circumference.

14. The container of claim 13, further including longitudinal ribs in the post walls.

15. The container of claim 1, further including at least one recessed circumferential hoop rib in the panel section.

16. The container of claim 15, further including recessed circumferential hoop ribs in the panel section above and below the recessed panels.

17. The container of claim 1, wherein the sidewall includes an upper shoulder section with a recessed circumferential hoop rib which axially stretches to relieve an increase in pressure during the heating step.

18. The container of claim 1, wherein the closed bottom end has a central recessed dome and surrounding the dome a circumferential standing ring which lies in a horizontal plane, an area of the as-molded dome adjacent the standing ring being disposed at an acute angle A to the horizontal plane.

19. The container of claim 18, wherein A is on the order of 5 to 15°.

20. The container of claim 19, wherein A is on the order of 8 to 12°.

21. The container of claim 1, having six recessed panels each with a central wall having a circumferential extent on the order of 32 to 50°.

22. The container of claim 21, wherein the circumferential extent of each central wall is on the order of 36 to 46°.

23. The container of claim 1, wherein the container body is made of polyester and the panel section has a wall thickness on the order of 0.012 to 0.025 inch.

24. The container of claim 1, wherein the central wall includes a protrusion for supporting a label disposed about the panel section.

25. The container of claim 1, wherein the plastic is selected from the group consisting of polyester, polyolefin, polycarbonate, polyacrylate, polyacrylonitrile, and copolymers thereof.

26. The container of claim 1, wherein the container is a substantially transparent, polyester container.

27. The container of claim 26, wherein the polyester is substantially polyethylene terepthalate (PET).

28. The container of claim 26, wherein the polyester is substantially polyethylene naphthalate (PEN).

29. The container of claim 1, wherein the sidewall includes an upper shoulder section having a protruding profile.

30. The container of claim 1, wherein the bottom end includes stiffening ribs.

31. The container of claim 1, wherein the open upper end is a substantially amorphous neck finish, and further including a foil liner sealing a top end of the amorphous neck finish.

32. The container of claim 1, wherein the open upper end is a substantially opacified neck finish, and further including a closure having a resilient material for sealing a top end of the neck finish.

* * * * *